US011714693B2

(12) United States Patent
Kennedy, Jr.

(10) Patent No.: US 11,714,693 B2
(45) Date of Patent: *Aug. 1, 2023

(54) DATA DRIVEN API CONVERSION

(71) Applicant: Jitterbit, Inc., Alameda, CA (US)

(72) Inventor: Thomas R. Kennedy, Jr., Miami Beach, FL (US)

(73) Assignee: Jitterbit, Inc., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,914

(22) Filed: Mar. 14, 2022

(65) Prior Publication Data
US 2022/0342734 A1  Oct. 27, 2022

Related U.S. Application Data

(63) Continuation of application No. 16/918,594, filed on Jul. 1, 2020, now Pat. No. 11,275,636, which is a continuation of application No. 16/361,838, filed on Mar. 22, 2019, now Pat. No. 10,705,897, which is a continuation of application No. 15/654,319, filed on Jul. 19, 2017, now Pat. No. 10,282,241.

(51) Int. Cl.
| G06F 9/54 | (2006.01) |
| H04L 67/02 | (2022.01) |
| H04L 9/40 | (2022.01) |
| H04L 69/18 | (2022.01) |
| H04L 67/565 | (2022.01) |

(52) U.S. Cl.
CPC ............ G06F 9/547 (2013.01); H04L 63/083 (2013.01); H04L 67/02 (2013.01); H04L 67/565 (2022.05); H04L 69/18 (2013.01)

(58) Field of Classification Search
CPC .................................. G06F 9/541; G06F 9/546
USPC .................................................. 719/313, 328
See application file for complete search history.

(56) References Cited

U.S. PATENT DOCUMENTS

| 8,296,784 | B1 | 10/2012 | Brown et al. |
| 9,450,944 | B1* | 9/2016 | Sousley ............ H04L 63/0807 |
| 9,621,440 | B2 | 4/2017 | Williams et al. |
| 10,282,241 | B1 | 5/2019 | Kennedy, Jr. |
| 10,705,897 | B1 | 7/2020 | Kennedy, Jr. |
| 11,275,636 | B1 | 3/2022 | Kennedy, Jr. |
| 2014/0122996 | A1 | 5/2014 | Gupta et al. |
| 2017/0134427 | A1* | 5/2017 | Hutchins ................ H04L 67/02 |
| 2017/0177311 | A1 | 6/2017 | Kaulgud et al. |
| 2017/0180513 | A1* | 6/2017 | Doyle .................... G06Q 20/12 |

* cited by examiner

*Primary Examiner* — Andy Ho
(74) *Attorney, Agent, or Firm* — Fredrikson & Byron, P.A.

(57) ABSTRACT

Methods, systems, and apparatus, including computer programs encoded on computer storage media, for a dynamic api, includes receiving a first message in a first format from a client, the first format being specified for the client, the first message including information sufficient to cause a target service to execute an operation. The method includes identifying, using the API message, the target service. The method includes determining based of the target, a second format. The method includes generating a second message in the second format prescribed by the target service using the first message, the second message including information sufficient to cause the target service to execute the operation. The method also includes sending the second message to the target service over the network connector.

20 Claims, 7 Drawing Sheets

| Host/Path: | 402 | samplerestapi.com/dataget |
| Auth Type: | 404 | Api key ▽ |
| Auth Parameter(s): | 406 | key |
| Return Format: | 408 | path based ▽ |
| Return Format Path: | JSON: 410 | JSON |
| | XML: 412 | XML |
| Pagination: | 414 | page ▽ |
| Pagination Parameters: | 416 | page |

Sample Call: 420 samplerestapi.com/dataget/JSON?key=XX&id=XX&page=XX

| Parameter | Path, Query, or HTTP Header? |
|---|---|
| key | Query string |
| id | Query String |
| page | Query String |
| | |
| | |
| | |
| | |
| | |

422

Add Parameter — 424   Delete Parameter — 426

| | | | |
|---|---|---|---|
| Company: | 502 | mycompany | |
| Auth Type: | 504 | Basic auth | ▽ |
| Auth Parameter(s): | 506 | | |
| Return Format: | 508 | json | ▽ |
| Return Format Parameter: | 510 | | |
| Pagination: | 512 | index | ▽ |
| Pagination Parameters: | Index: | 514 index | |
| | Limit: | 516 limit | |
| Parameter Type | 518 | query string | ▽ |

Sample Call ⌐ 520 snapi.zudy.com?index=XX&index=XX

Parameters: ⌐ 522

| |
|---|
| index |
| limit |
| |
| |
| |
| |
| |
| |
| |

DATA DRIVEN API CONVERSION

CROSS-REFERENCE TO RELATED APPLICATIONS

This application is a continuation application of and claims priority to U.S. application Ser. No. 16/918,594, filed on Jul. 1, 2020, which is a continuation application of U.S. application Ser. No. 16/361,838, filed on Mar. 22, 2019, now U.S. Pat. No. 10,705,897, which is a continuation application of U.S. application Ser. No. 15/654,319, filed on Jul. 19, 2017, now U.S. Pat. No. 10,282,241. The entire disclosure of each application is incorporated by reference herein.

BACKGROUND

An Application Programming Interface (API) defines the way for an application to interact with certain system/application/library/etc. A RESTful API uses Hypertext Transfer Protocol (HTTP) requests to access data and services. These APIs are developed without a common agreement of what to call them, how to consume them or even how you secure them. Developed in isolation, such APIs can be consumed differently, secured in a customized manner, etc.

SUMMARY

This specification describes technologies relating to RESTful APIs.

In general, one innovative aspect of the subject matter described in this specification can be embodied in methods that include the act of receiving a first message in a first format from a client, the first format being specified for the client, the first message including information sufficient to cause a target service to execute an operation. The methods include the act of identifying, using the API message, the target service. The methods include the act of determining based of the target, a second format. The methods include the act of generating a second message in the second format prescribed by the target service using the first message, the second message including information sufficient to cause the target service to execute the operation. The method includes the act of sending the second message to the target service over the network connector.

Particular embodiments of the subject matter described in this specification can be implemented so as to realize one or more of the following advantages. Companies may access RESTful APIs using their standards instead of requiring an understanding of multiple different implementations.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features. The methods may include the acts of receiving results from the target service in a first return format, and generating results in a second return format, the second return format selected based on the sender of the message. The methods may include the acts of identifying an error code and an error message within the results, generating an error in a format specified by the sender, and sending the error message to the sender. The methods may include the acts of identifying at least one error returned from the target service, and providing the error to the sender in a second error format, the second error format determined based on the sender. The methods may include the act of authenticating the sending using a first authentication method different from a second authentication method used in the second message. The system may receive requests from the sender over a network. The system may be operated by the sender. The target service may be a RESTful service.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates an example of a user interface 400 for specifying an API for a RESTful service.

FIG. 5 is an example of a user interface 500 where an organization can specify its standard API format.

Like reference numbers and designations in the various drawings indicate like elements.

DETAILED DESCRIPTION

In general, a RESTful service and API refer to an architecture in which a client makes request of a service. The state of a particular requests is not maintained by the service while the service is not processing the request. Instead, the state is transferred from the RESTful service to a client. Transferring state from the service to the client reduces the complexity of the service, allowing the service to have improved scalability. Scalability is improved because not having to store state between requests allows the service to quickly free resources. At the same time, responding to requests is simplified because the server doesn't have to manage resource usage across requests. As the RESTful service does not maintain state between requests, each request includes information sufficient to process the request.

Figure 1:
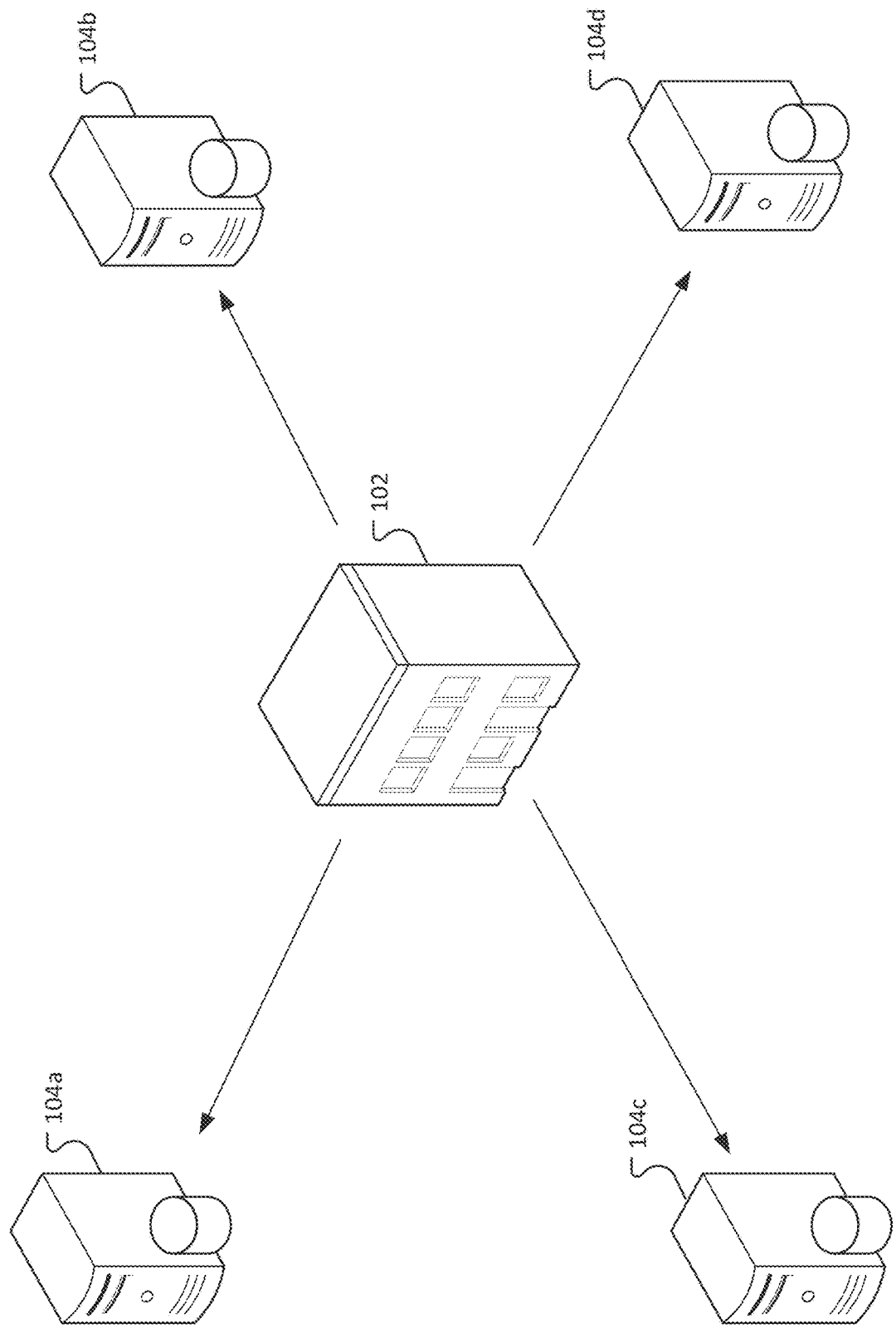
FIG. 1 illustrates an organization accessing RESTful Services.

FIG. 1 illustrates an organization 102 accessing RESTful Services (104a-104d). Each RESTful service (104a-d) can establish its own format for sending and receiving messages. RESTful APIs allow access to applications and services using the Hypertext Transport Protocol (HTTP). In general, a client sends an HTTP request to a web server that enables access to the RESTful API. The web server API can dictate the format and information necessary to interact with the API. For example, RESTful APIs can be configured to use at least four different security options, at least two different results formats, at least three different query parameter formats, at least three different error response options, and at least three different pagination options. Accordingly, there are at least 216 variations on the ways that a RESTful API can be configured. As such, accessing a different API requires considerable research and developer time within the organization 102 to enable an application to access the various APIs.

Figure 2:
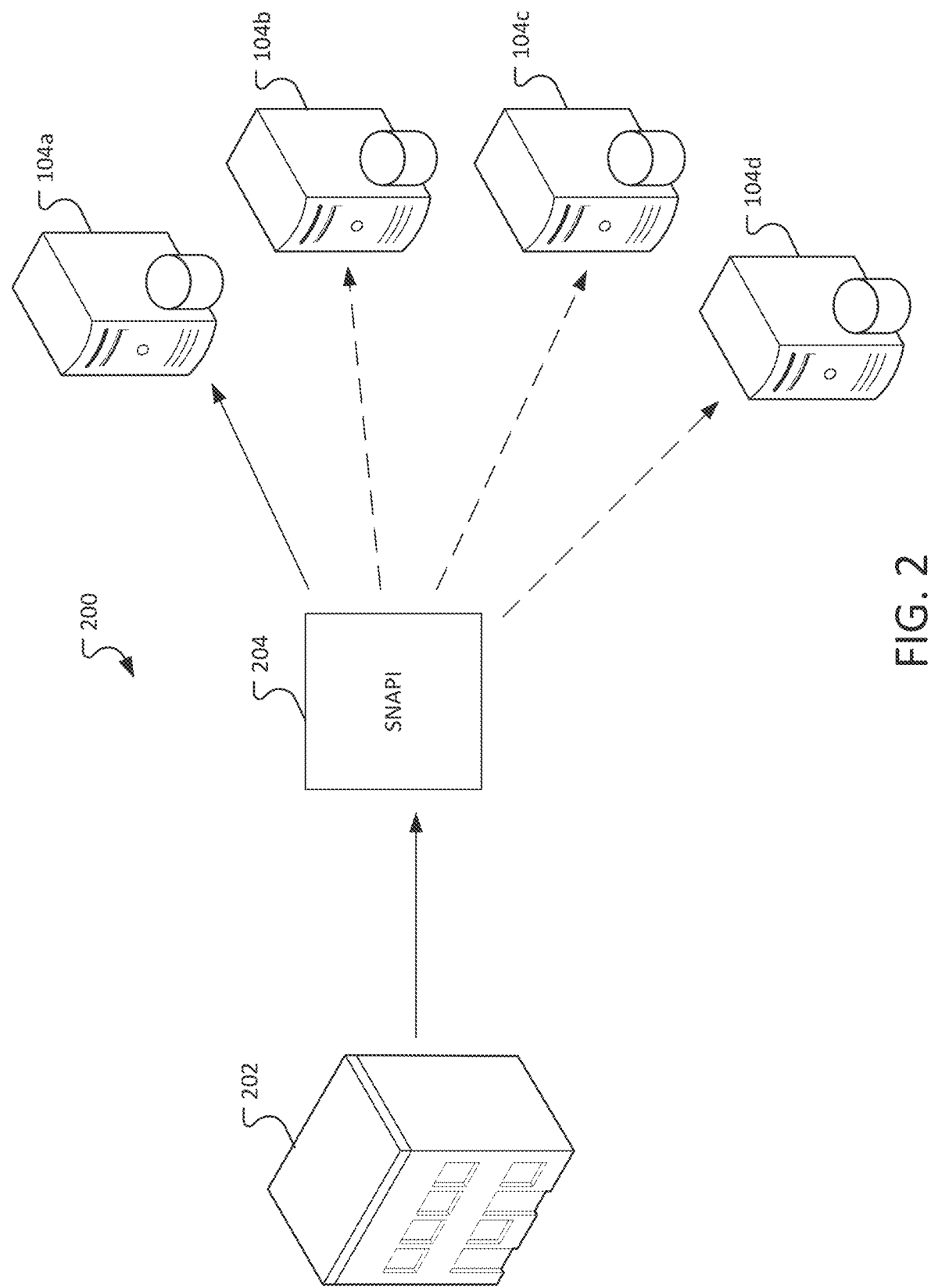
FIG. 2 illustrates an example environment where an organization uses a standard application programing interface (SNAPI) component.

FIG. 2 illustrates an example environment where an organization 202 uses a standard application programing interface (SNAPI) component 204 to enable organizations to access a variety of different RESTful services using a consistent API format. The organization 202 contacts the SNAPI component 204 using a predetermined API. For example, the parameters for the API is selected by the organization (for example, the organization may wish to use Basic authentication with parameters in the query string and receive the results as Javascript Object Notation (JSON) objects.) The SNAPI component 204 can accept an HTTP request, Uniform Resource Identifier (URI), etc. provided by the organization, translate the HTTP request, URI, etc. into a form accepted by an interface of a service (e.g. a service selected from the RESTful services 104a-d), and send a translated request to the selected service 104a.

When the service 104a provides results to the request, the SNAPI 204 can translate the results into a format as requested by the organization 202. For example, if the service 104a provides results in Extensible Markup Language (XML) format, the SNAPI component 204 can translate the XML results to JSON formatted results.

In this manner, the SNAPI component 204 enables the organization 202 to standardize their RESTful API calls while interfacing with a variety of different RESTful services that each use their own (and not necessarily consistent) versions of a RESTful API.

The SNAPI component 204 can be, for example, a component that is implemented by the organization or may be offered as a web service.

Figure 3:
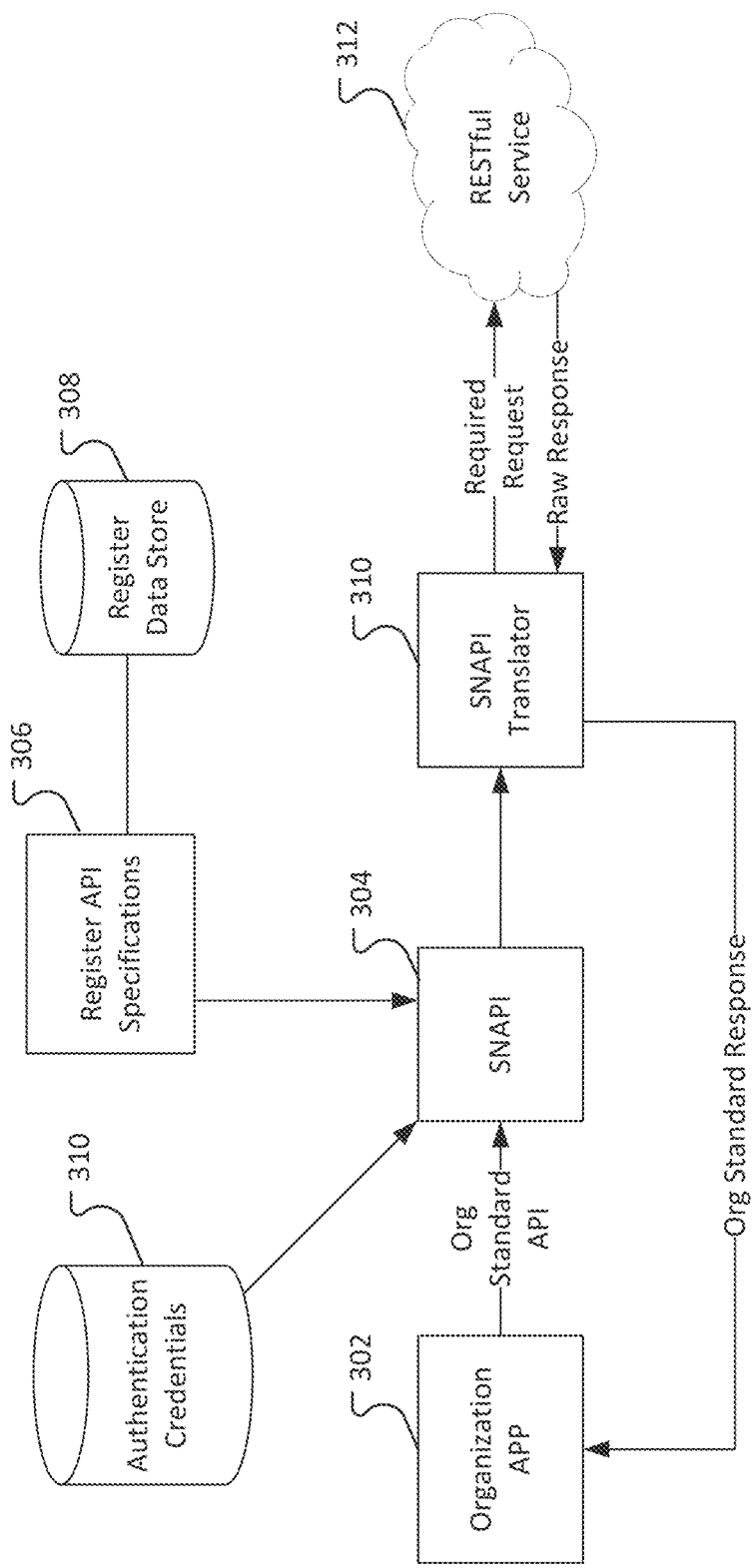
FIG. 3 illustrates an example implementation of a SNAPI component.

FIG. 3 illustrates an example implementation of a SNAPI component 304. In this example, an organization application 302 accesses data provided by a RESTful service 312 using a SNAPI component 204. The organizational application 302 can send a request to the SNAPI component 304. The sent request can be formatted using the organization's standard API format. The SNAPI component 304 obtains a registered API specification 306 that defines a structure of the request which is acceptable to the RESTful service 312.

The specification that describes the acceptable structure can be stored in a register data store 308. The register data store 308 may be, for example, a database, a file in a file system, etc.

The SNAPI component 304 provides the registered API specification and the request from the organization app 302 to a SNAPI translator 310. In some implementations, the SNAPI translator 310 may be integrated into the SNAPI component 304. The SNAPI translator 310 translates the request from the organization app 302 into a request having a format acceptable by the RESTful service 312.

To interface with a service an operations referred to as a call may be employed. RESTful API calls to RESTful services can be complex and varied in their form and structure. The basic component of a RESTful API call is a Uniform Resource Identifier (URI) string. The general structure of an HTTP URI string is as follows:

scheme:[//[userpassword@]host[port]][/]path[?query]

Stepping through this example, from left to right. The scheme consists of a sequence of characters beginning with a letter and followed by any combination of letters, digits, plus (+), period (.), or hyphen (-). Examples of popular schemes include http, https, ftp, mailto, file, and data.

Following the scheme, the URI can also include an optional authentication section of a user name and password, separated by a colon, followed by an at symbol (@). In general, when using HTTP Basic authentication, the client strips the credentials from the URI and pass them as an HTTP header (e.g. Authorization: Basic base64(user:password)).

Next in the sequence, a "host" is generally considered the address of the service. The "host" consists of a registered name (including but not limited to a hostname), or an IP address, etc. An optional port number can be separated from the hostname by a colon. A port refers to an endpoint of a communication over the network. By default, webservers listen on port 80, however other ports can be used. When the organization makes a request to the SNAPI component, the host may refer to the SNAPI component directly, but the request may contain information sufficient to identify the target RESTful service. For example, the host "geolocation-.snapi.example.com" may correspond to the target host "www.googleapis.com/geolocation/v1/geolocate". A mapping between the host and the target host may be stored in a persistent data store or may follow a predetermined naming convention.

Continuing through the presented example, a path usually includes data organized in hierarchical form, which appears as a sequence of segments separated by slashes.

An optional query string can be provided in the URI. The query string is separated from the preceding parts of the URI by a question mark "?". The query string can contain non-hierarchical data. Typically, the syntax of a query string is not well defined, but is often a sequence of attribute—value pairs separated by a delimiter. The query string can separate attribute-value pairs using a delimiter, such as a '&' or ";".

Different APIs can use these parts of the URI string in different ways. For example, some API expect the input parameters in the query string (for example, "http://www.rest.services.com/get?item=b&output=j son"), others expect the parameters in the path (for example, "http://www.rest.services.com/json/item/b,"), while others use a combination of both the path and query string (for example, "http://www.rest.services.com/json?item=b").

The SNAPI translator 310 can translate from one parameter format/structure to another. The API specification (for example, from Register Data Store 3058) can identify the parameters and values that are expected by the RESTful service. The SNAPI translator 310 can read all of the parameters provided by the organizations' request and reformat them into the format required by the RESTful service of interest. For example, a request to "http://www.rest.services.com/json/item/b" can be parsed such that item='b', etc.

RESTful APIs can use several different authentication methods, including API keys, Basic authentication, OAuth, etc. An API key is a code passed in by computer programs calling an API (application programming interface) to identify the calling program, its developer, or its user to the Web site. API keys are used to track and control how the API is being used (for example to prevent malicious use or abuse of the API (as defined perhaps by terms of service)). The API key often acts as both a unique identifier and a secret token for authentication, and will generally have a set of access rights on the API associated with it. API keys can be based on the unique identification system to ensure they will be unique to each user. The API key can be provided as a parameter in the URI (for example, "http://www.rest.services.com/json?apikey=1929E23AD32BC0AF", where "929E23AD32BC0AF" is the API key). The API key can also be provided as part of an HTTP header (for example, "X-API-Key: 29E23AD32BC0AF").

Basic authentication can be performed by using a standard HTTP header with a user name and password. The user name and password are general encoded (for example using base64.) Base64 is a binary-to-text encoding scheme that represents binary data in an ASCII string format by translating it into a radix-64 representation.

For still another method, OAuth is an open standard for authentication, commonly used as a way for Internet users to access (log in) third party websites using their Google, Facebook, Microsoft, Twitter, One Network, etc. accounts without exposing their password. Generally, OAuth provides clients a "secure delegated access" to server resources on behalf of a resource owner. It specifies a process for resource owners to authorize third-party access to their server resources without sharing their credentials. Designed specifically to work with HTTP, OAuth allows access tokens to be issued to third-party clients by an authentication server, with the approval of the resource owner. The third party then uses the access token to access the protected resources hosted by the resource server.

In order to translate between these different authentication schemes, the SNAPI component 304 is capable of authenticating an organization, user, etc. using any of the above authentication schemes. Therefore, when the organization sends the request to the SNAPI component, the organization authenticates itself with the SNAPI component 304 using their preferred authentication method.

In some implementations, the SNAPI component 304 may identify the source of the message (for example, using an Internet protocol address or a parameter or values in the request). The SNAPI component 304 may look up the preferred authentication type based on the source and validate the message accordingly.

In some implementations, the SNAPI component 304 may validate the request by checking each possible authentication method. If the request can be successfully authenticated using any valid authentication method then the message is authenticated.

The API specification 306 can store the authentication scheme required by the RESTful service. The SNAPI component 304 can obtain stored credentials for the organization from a credentials data store 314. For example, the credentials data store 314 may store authentication credentials for the organization for each RESTful service that the organization accesses using the SNAPI component 304. In some implementations, the organization registers its credentials with the SNAPI component 304 when the organization registers an interest in a particular API. In some implementations, the SNAPI component 304 may obtain an initial set of credentials for the organization when the organization accesses an API for the first time.

Some requests to a RESTful service can produce a large number of results. Instead of providing hundreds of results in a single response document, some services can elect to provide results incrementally. Incremental results can be provided by either providing a page pointer, an index value, a limit, etc.

A page pointer can be used when the RESTful API provides pages of predetermined size. For example, for a page size of 25 results, the parameter "?page=1" may return results numbered 1-25, while "?page=2" may return results numbered 26-50.

An index may identify the first result in the result set to return. For example, "?index=26" may request that the results begin with the result numbered 26. In some implementations, the number of results returned may be predetermined (e.g. 10, 20, 30, etc.) by the RESTful service. In other implementations, the numbered results returned may be determined by a limiting parameter. For example, a query string that includes "?index=35&limit=10" may return a batch of ten results starting with the $35^{th}$ result (i.e., results 35-44).

The SNAPI translator 310 may translate one form of pagination into another. For example, if an organization uses a page number parameter and the RESTful service uses an index and a limit, the SNAPI translator may determine the index as the sum of the page number and page size, and the limit as the page size. Alternatively, if an organization uses index and limit parameters and the RESTful service uses pages, the SNAPI translator 310 may send one or more different request? messages and process the results to return the requested set of data.

For example, if the organization requests items 10-19 (index 10, limit 10) and the RESTful service provides pages of 25, the SNAPI translator 310 may request page 1 and then only provide items 10-19 as a result. However, if the organization instead requests items 20-29 (index 20-limit 10), the SNAPI translator may request page 1 and page 2 (possibly using multiple requests), receiving records 1-50. The SNAPI translator 310 may then return only the requested records.

The SNAPI translator 310 (or the SNAPI component 304) sends the translated request to the RESTful service 312.

Typically, the RESTful service 312 sends back a response in a format dictated by the RESTful service 312. The SNAPI translator 310 translates the raw response into the organization standard response format. The raw response can be, for example, the data requested by the request or can be an error message.

In general, RESTful APIs return results in one of two different formats: XML or JSON. XML is a markup language that defines a set of rules for encoding documents in a format that is both human-readable and machine-readable. JSON is an open-standard format that uses human-readable text to transmit data objects consisting of attribute—value pairs.

The SNAPI translator 310 may convert XML results to JSON results and JSON results to XML results, depending on the format requested by the organization.

Error handling can require additional customization. There are multiple different ways that a RESTful service may handle error conditions. For example, one service may use HTTP status codes (for example, status 401 for an authentication required message). Another service may embed an error message within a return result that is otherwise valid (e.g. an HTTP status code 200). Some services may include additional information about the error, while others may not.

The SNAPI translator 310 can use different techniques to configure the error handling. For example, part of the configuration of the web service may indicate a location in a result set where an error code made be present, or may indicate that the RESTful API uses HTTP status codes for errors. In some implementations, the configuration may specify a location of the error code and a location of an error message.

In some implementations, the SNAPI translator 310 can use other techniques to identify and parse error messages, including, but not limited to, regular expressions, XML parsers, and JSON parsers.

For example, if it's an authentication error (e.g. 401 Unauthorized) indicating that the user needs to authenticate, The SNAPI translator may attempt to authenticate and reissue the request. For example, if the REST API uses OAuth, and the OAuth access token has expired, The SNAPI translator can automatically refresh the access token. Having refreshed the access token, The SNAPI translator can reissue the original request. Because refreshing the access token is a back-channel communication between The SNAPI translator and the REST API's authorization server, the client is unaffected: the client never sees the error.

If it's an authorization error (e.g. 403 Forbidden) indicating that the user does not have access to the given resource, The SNAPI translator can return a 403 Forbidden HTTP status code to the client. In this situation, the error is more or less passed through the system back to the client.

If the error occurs while trying to modify the resource (e.g. save a customer), and it indicates that there is something wrong with the request (e.g. 400 Bad Request), it can be treated as a validation error. The SNAPI translator can return the item (customer) to the client. Note that the item may be different than what the client sent. For instance, The SNAPI translator may have set one or more default values. In addition to the item, The SNAPI translator can include the error message from the server. It can appear as a validation result. In this way, errors returned from the REST service are treated the same as validation errors that might have been found before The SNAPI translator submitted the request to the REST API.

FIG. 4 illustrates an example of a user interface 400 for specifying an API for a RESTful service. For example, an administrator may configure a SNAPI component using the user interface 400. The user interface 400 may be a Hypertext Markup Language (HTML) page presented by a web server.

The user interface 400 allows the user to specify a host/path name 402 for the RESTful service. The host name and path name define the basis for the RESTful API call, as described above.

The user interface 400 allows the user to specify the authentication type 404 required by the RESTful service. In this example, the authentication type 404 is selected from a drop down menu of potential authentication types (for example, Basic authentication, API key, OAuth, none).

The user interface 400 also allows the user to specify the name of the parameters 406 that are used in the authentication (in this example, the parameter "key") and referred to as "Auth Parameters". For some authentication types there may not be variable parameter names (for example, for Basic authentication the names of the header fields are predetermined). If there are no parameters available, the area used to specify the auth parameters 406 may be greyed out, invisible, collapsed, or otherwise inaccessible.

The user interface 400 can also allow the user to specify the return format 408 of the RESTful service. As described above, the return format may be either JSON or XML. In this example, the user can select from a drop down list (for example, JSON, XML, query based, path based). In this example, the return type is determined based on the path or the URL. The user interface 400 includes a return format path where the user can specify the path to request a JSON return type 410 and one for an XML 412 return type. Alternatively, if the user selects the query based option, the user interface 400 may include a field where a user may specify a parameter and one or more values that correspond to the return types.

The user interface 400 includes a field 414 where the user can specify how results are paginated. In this example, the user may select from a drop down list that includes the valid options (for example, page, index, none). The user can also specify the name of the pagination parameter 416. If the user were to select the "index" option, the pagination parameters may include an index and a limit value that the user can select.

The user interface 400 also includes a parameter area 422. Parameters defined in the user interface 400 can appear in this window. In this example, the key parameter, defined in the authentication parameters 406, and the page parameter, defined in the pagination parameters 414, appear in this area. The user can also add additional parameters, for example, by selecting the add parameter button 424. In this example, the user has added an id parameter, indicating that the RESTful service accepts (or expects) an id parameter. In some implementations, the user can also specify whether each parameter is required or optional. The user can also delete a parameter, for example, by selecting the delete parameter button 426. In some implementations, the user may be prevented from deleting parameters created based on the fields above (such as a password parameter).

The user may also sort the parameters, for example, by dragging and dropping a field. This enables the user to specify an ordering of parameters for services where the ordering is important.

The user interface 400 also includes a sample call 420. The sample call is a visual representation of what a call to the RESTful service would look like. It allows the user to check their data against the API.

FIG. 5 is an example of a user interface 500 where an organization can specify its standard API format. A company field 502 identifies the name of the company. The company 502 field may be prefilled based other information provided by the user. For example, a user's login information may be associated with a particular company. In some implementations, the company field 502 may be specified by a user as part of a registration process.

An authentication type field 504 allows the user to select between a predetermined number of options (for example, using a drop down list). In some implementations, the user can select from a list including for example, Basic authentication, API key authentication, OAuth, or none. In some implementations, the system may require that the organization be associated with some authentication method (for example, none may not be a valid option.)

The authentication parameters field 506 allows the user to specify parameters based on the type of authentication selected in the authentication type field. In this example, the user has selected Basic authentication. As Basic authentication uses predefined entries in an HTTP header, the authentication parameters field 506 is disabled. If the user had, instead, for example, selected the API key authentication, the user would be able to specify the name of the parameter to include the API key.

The user interface 500 can also allow the user to specify the return format 510 of the RESTful service. As described above, the return format may be either JSON or XML. In this example, the user can select from a drop down list (for example, JSON, XML, query based, path based). In this example, the user has selected to receive JSON responses. Accordingly, the return format parameter 510 field is disabled.

The user interface 500 includes a pagination field 512 where the user can specify how results are paginated. In this example, the user may select from a drop down list that includes the valid options (for example, page, index, none). Here, the user has selected "index." The user can also specify the name of the pagination parameters 416. The pagination parameters may include the names of variables that will include the index 514 and the limit 514 values.

The user interface 500 also includes a parameter type field 518 that enables the user to define whether parameters are included in the query string, a path, a http header, or a combination thereof. In this example, the user has selected query string parameters.

The user interface 500 also includes a parameter area 522 for presenting parameters defined in the user interface 500. In this example, the index and limit parameters appear (defined in the pagination parameters area, described above). The user may also sort the parameters, for example, by dragging and dropping a field. This enables the user to specify an ordering of parameters for services where the ordering is of interest.

The user interface 500 also includes a sample call 520. The sample call is a visual representation of what a call to the SNAPI component will look like. It allows the user to check their data against the API.

Figure 6:
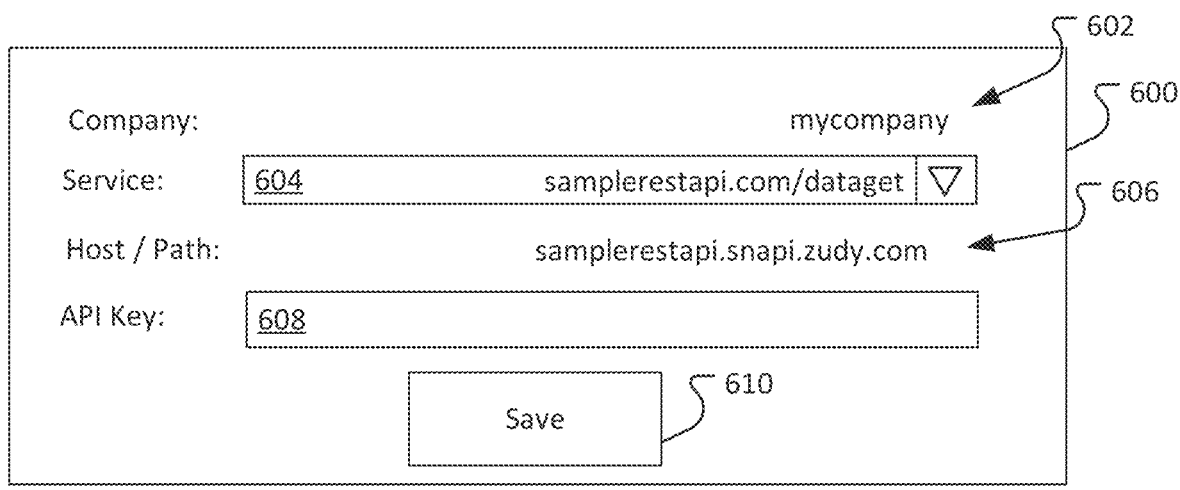
FIG. 6 is a user interface that registers an organization to use a particular web API.

FIG. 6 is a user interface 600 that registers an organization to use a particular web API. In order to use an API, an organization may be required to provide certain information, such as security information. The user interface 600 collects required information from a user from the organization. In this example, the user interface 600 displays the name of the organization 602 in the user interface 600.

The user interface 600 includes a service field 604 where the user can select the service to configure. The service may be selected using a drop down list or using a search function. In some implementations, the search function can be integrated into the user interface 600. For example, as the user begins to type in the service field 604 the drop down list is populated with services that meet search criteria defined by the data in the service field 604.

The SNAPI component or user interface 600 may access data that describes the selected service. For example, the SNAPI component or user interface 600 may determine that use of the service requires authentication data. The user interface 600 requests the required data from the user. In this example, the user interface 600 displays an API key field 608. The user can supply the API key that the company uses to access the selected service. As different authentication methods require different information, the user interface may display additional data when the object is selected. For example, if the user selects a service that uses Basic authentication, the user may be asked to provide a username and password/secret.

The user can save the data entered into the fields by selecting the save button 610.

The data from the user interface 600 may be stored in a persistent data store, for later access.

Figure 7:
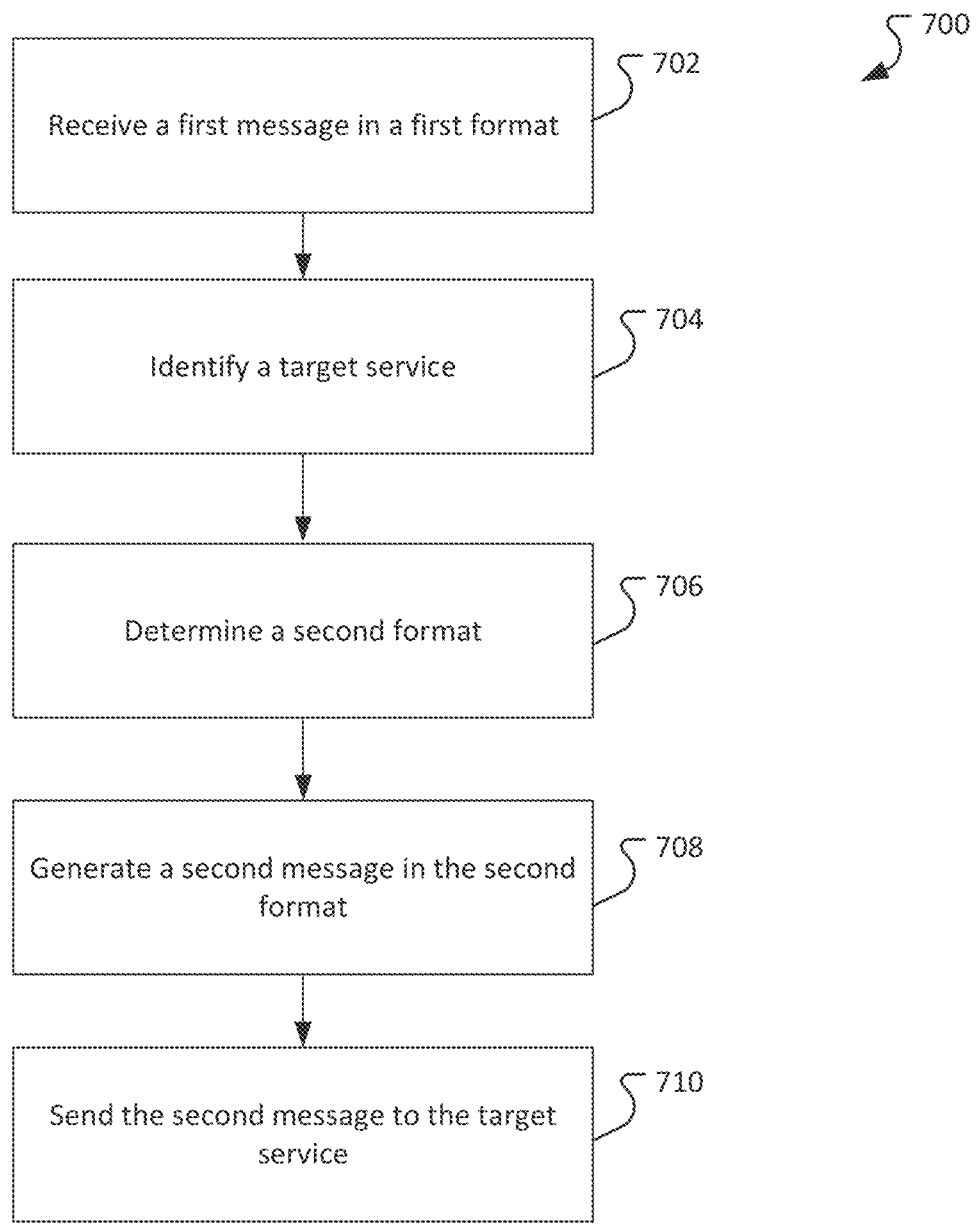
FIG. 7 is a flow chart of an example process 700 for an API system.

FIG. 7 is a flow chart of an example process 700 for an API system.

The process receives 702 a first message in a first format from a client, the first format being specified for the client, the first message including information sufficient to cause a target service to execute an operation.

The process 700 identifies 704, using the API message, the target service

The process 700 determines 706 based of the target, a second format.

The process 700 generates 708 a second message in the second format prescribed by the target service using the first message, the second message including information sufficient to cause the target service to execute the operation.

The process 700 sends 710 the second message to the target service over the network connector.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
  one or more storage devices storing instructions that are operable, when executed by one or more computers, to cause the one or more computers to perform operations comprising:
    receiving data specifying a first format for one or more messages receivable from a client device and a response format for one or more response messages for sending to the client device;
    receiving a first message in the first format from the client device;
    identifying, from the first message, a target service;
    determining, based on the target service that is identified, a second format;

generating a second message in the second format using the first message;

sending the second message to the target service; and sending, to the client device, a response message in the response format.

2. The system of claim 1, further comprising:

receiving results from the target service in a first return format; and modifying the results to a second return format, the second return format selected based on the data specifying the response format from the client device.

3. The system of claim 1, further comprising:

identifying an error code and an error message received from the target service;

generating an error in the response format; and sending the error message to the client device.

4. The system of claim 1, further comprising:

identifying at least one error returned from the target service; and providing the error to the client device in a second error format, the second error format determined based on the response format.

5. The system of claim 1, further comprising:

authenticating the sending using a first authentication method different from a second authentication method used in the second message.

6. The system of claim 1, wherein the system is operated by the client device.

7. The system of claim 1, wherein the target service is a RESTful service.

8. A computer-implemented method comprising:

receiving data specifying a first format for one or more messages receivable from a client device and a response format for one or more response messages for sending to the client device;

receiving a first message in the first format from the client device;

identifying, from the first message, a target service;

determining, based on the target service that is identified, a second format;

generating a second message in the second format using the first message;

sending the second message to the target service; and sending, to the client device, a response message in the response format.

9. The computer-implemented method of claim 8, further comprising:

receiving results from the target service in a first return format; and modifying the results to a second return format, the second return format selected based on the data specifying the response format from the client device.

10. The computer-implemented method of claim 8, further comprising:

identifying an error code and an error message received from the target service;

generating an error in the response format; and sending the error message to the client device.

11. The computer-implemented method of claim 8, further comprising:

identifying at least one error returned from the target service; and providing the error to the client device in a second error format, the second error format determined based on the response format.

12. The computer-implemented method of claim 8, further comprising:

authenticating the sending using a first authentication method different from a second authentication method used in the second message.

13. The computer-implemented method of claim 8, wherein the target service is a RESTful service.

14. A non-transitory computer storage medium encoded with computer program instructions that when executed by one or more computers cause the one or more computers to perform operations comprising:

receiving data specifying a first format for one or more messages receivable from a client device and a response format for one or more response messages for sending to the client device;

receiving a first message in the first format from the client device;

identifying, from the first message, a target service;

determining, based on the target service that is identified, a second format;

generating a second message in the second format using the first message;

sending the second message to the target service; and sending, to the client device, a response message in the response format.

15. The non-transitory computer storage medium of claim 14, the operations further comprising:

receiving results from the target service in a first return format; and modifying the results to a second return format, the second return format selected based on the data specifying the response format from the client device.

16. The non-transitory computer storage medium of claim 14, the operations further comprising:

identifying an error code and an error message received from the target service;

generating an error in the response format; and sending the error message to the client device.

17. The non-transitory computer storage medium of claim 14, the operations further comprising:

identifying at least one error returned from the target service; and providing the error to the client device in a second error format, the second error format determined based on the response format.

18. The non-transitory computer storage medium of claim 14, the operations further comprising:

authenticating the sending using a first authentication method different from a second authentication method used in the second message.

19. The non-transitory computer storage medium of claim 14, wherein the target service is a RESTful service.

20. The system of claim 1, the operations further comprising:

determining, based on the client device, a type of authentication for validating the first message; and validating the first message in accordance with the type of authentication.

* * * * *